Patented Apr. 23, 1929.

1,710,453

UNITED STATES PATENT OFFICE.

MAURICE VALENTINE HITT, OF PARLIN, NEW JERSEY, ASSIGNOR TO E. I. DU PONT DE NEMOURS & COMPANY, OF WILMINGTON, DELAWARE, A CORPORATION OF DELAWARE.

NITROCELLULOSE COATING COMPOSITION AND FILM MADE THEREFROM.

No Drawing. Application filed October 13, 1923. Serial No. 668,285.

This invention relates to coating compositions and films made therefrom, and more particularly to nitrocellulose lacquers and enamels wherein the nitrocellulose has a specific viscosity characteristic and a solvent softener is present to impart certain new characteristics to the lacquers and enamels and films made therefrom, all as more particularly hereafter described.

The invention has as an object the production of nitrocellulose lacquer and enamel compositions containing solvent softeners, particularly nitrocellulose having a certain specific viscosity characteristic. Another object of the invention is to provide such compositions wherein the content of total solids, exclusive of pigments, is more than 15% and the nitrocellulose content more than 7% after the composition has been thinned down to a viscosity between 100 and 300 centipoises as measured by the Stormer viscometer at 28° C. A further object is to properly proportion the ingredients of the compositions, particularly in reference to the pigments, in order to obtain the most advantageous results. A still further object is to provide films and articles coated with films from the aforesaid compositions, which films shall be hard, durable, tough, adhesive, and non-shrinking. Further objects will be apparent as the following description proceeds.

In the manufacture of pyroxylin lacquers and enamels as heretofore carried on, it has not be practicable to make solutions having a nitrocellulose content, after thinning to the extent required for use as a dip or spray lacquer, namely, 100–300 centipoises, of more than about 6%, for with ordinary nitrocellulose, more than this proportion thereof renders the solution too viscous. Moreover in the presence of this maximum amount of nitrocellulose the proportion of gum had to be comparatively low, so that as a rule it has been necessary to limit the total solids content of these old lacquers and enamels, exclusive of pigment, when thinned to spraying viscosity, namely 100–300 centipoises, to less than 13%.

In connection with the compositions of my invention I have found that by using reduced-viscosity nitrocellulose, which may be produced, for example, as described in the application of E. C. Pitman, Serial No. 594,994 filed October 16, 1922, lacquers and enamels may be prepared having a nitrocellulose content, based on the weight of the coating composition, exclusive of pigment, and after the required thinning to between 100 and 300 centipoises, of more than 7%, and, if desired above 9%, and a total solids content, exclusive of pigment above 15%. The main advantage attending the use of a high nitrocellulose, high total solids lacquer or enamel of this kind is that the number of coats which it is necessary to apply to form a coating of the desired thickness is materially reduced.

The description of the nitrocellulose content and total solids content as being determined after the required thinning to from 100 to 300 centipoises, is made necessary because of the fact that pyroxylin lacquers are sometimes made and sold in a concentrated form, that is, with a relatively high nitrocellulose content and high total solids content, but with a viscosity so high that the lacquer must be thinned or diluted with a volatile solvent to reduce the viscosity to the required value. When such old concentrated lacquers of the prior art have been thinned down to a working consistency they have, as explained above, a nitrocellulose content substantially less than 7%, and a total solids content substantially less than 15%. In discussing solutions of cellulose esters, etc., it is customary to indicate the concentration of the solution by reference to the number of ounces of cellulose ester, etc., dissolved in one gallon of solvent. For example, a solution obtained by dissolving 16 ounces of nitrocellulose in one gallon of ethyl acetate would be described as a 16 oz. ethyl acetate solution of nitrocellulose.

The ordinary types of pyroxylin lacquers and enamels heretofore known do not contain a solvent softener. This is quite natural in view of the fact that pryoxylin lacquers hitherto have been chiefly used for forming very thin films, and there has been less reason why a softener should be used. Furthermore, solvent softeners do not exhibit any special advantages in high viscosity nitrocellulose compositions. The new lacquers and enamels, on the other hand, made from reduced-viscosity nitrocellulose, are intended to enter an entirely new field in a new capacity—namely, as competitors of varnish and enamel paint. They will be used to form a comparatively thick coat on nearly rigid surfaces, and this coat must have sufficient flexibility to withstand ordinary blows and slight bending without cracking. This flexibility is attained by the use of a solvent softener.

It is probably still more important that a solvent softener be present because of the nature of the film made by reduced viscosity nitrocellulose. A solvent softener is important in solutions of reduced viscosity, such as those with which the present invention is concerned, because when the viscosity has been reduced to this degree the film more readily becomes brittle on aging, especially at elevated temperatures. Apparently the reduced viscosity nitrocellulose has less power to retain a non-solvent softener or even a solvent of high volatility, as compared with the ordinary type of pyroxylin which has hitherto been used. By using a solvent softener, and especially one that is substantially non-volatile, the original quality of the film is improved and its life is greatly prolonged. This effect is shown very definitely by tests on aging at 65° C. The use of acetyl-laurin, for instance, makes it possible to stamp the surface satisfactorily even after high temperature storage.

The advantages attending the use of a solvent softener in the new lacquers and enamels, as compared with the use of a non-solvent softener such as castor oil, comprise the great and unexpected improvement in flexibility of the film, better adhesion, freedom from blushing, ease of sanding and buffing, etc. Whereas low viscosity nitrocellulose of the herein described type will not provide a flexible film, yet the addition of a solvent softener will not only remove the brittleness by providing a film whose flexibility is largely retained, but it will also provide a material increase in the final flexibility of the film as compared with the original nitrocellulose itself. In this manner, the original low viscosity nitrocellulose is made available for all forms of lacquers and enamels where flexibility is required, whereas previously such low viscosity solutions had a more limited use even with the presence of a softener like castor oil.

As solvent softeners, I may use, for example, any one or more of the following substances: dibutyl phthalate, benzyl butyl phthalate (specifically the ortho-phthalates), acetyl-laurin (see G. L. Schwartz application Serial No. 551,734), camphor, and tricresyl phosphate and their equivalents. Among solvent softeners I prefer to use those which are substantially non-volatile, and for that reason dibutyl phthalate is not as good as the others mentioned because its volatility is too high in some cases. However, if it is used in connection with a practically nonvolatile softener it is usually very satisfactory. By the term "solvent softeners" I mean such substances as I have just recited and their equivalents, and preferably such as are liquid below 50° C. and have an appreciable solvent action on pyroxylin.

The following examples are illustrative of my invention, which is not, of course, limited thereto since many changes can be made therein without departing from the spirit and scope of the invention.

EXAMPLE 1.

A lacquer made in accordance with my invention may have the following composition, (the nitrocellulose used in this example having a viscosity, as measured in the form of a 16 oz. C. P. ethyl acetate solution thereof at 28° C., of between 550 and 1500 centipoises):

*Lacquer #1.*

|  | Per cent. |
|---|---|
| Nitrocellulose of reduced viscosity | 12.75 |
| Butyl acetate | 26.25 |
| Butyl alcohol | 8.70 |
| Ethyl acetate | 10.50 |
| Denatured alcohol | 10.00 |
| Acetone | 6.70 |
| Methyl alcohol | 4.80 |
| Resin or gum | 5.40 |
| Toluol | 12.90 |
| Acetyl laurin | 2.00 |
|  | 100.00 |

In place of the acetyl-laurin in the above formula, I may use another substantially non-volatile solvent softener such as dibutyl o-phthalate or benzyl butyl ortho-phthalate; the volatile solvents may also be varied in both composition and proportion.

For the resin constituent, I may use any varnish gum or resin that is soluble in the volatile ingredients of the lacquer, examples thereof being dammar, mastic, soft copals, elemi, rosin, sandarac, and shellac.

The viscosity of the above described lacquer #1 as measured by the Stormer viscometer at 28° C. is between 900 and 1100 centipoises. When thinned by adding 40 parts of thinner to 60 parts of lacquer its viscosity is between 100 and 300 centipoises.

The thinner used may have the following composition:

| | Per cent. |
|---|---|
| Ethyl acetate | 25 |
| Butyl acetate | 25 |
| Butyl alcohol | 10 |
| Toluol | 20 |
| Xylol | 20 |
| | 100 |

In preparing this lacquer #1, the following procedure may be followed, although the lacquer may also be prepared in various other ways:

Seventy-five parts by weight of a nitrocellulose base solution (a), containing a reduced viscosity nitrocellulose whose viscosity lies between 500 and 1500 centipoises in 16 oz. C. P. ethyl acetate solution, is mixed with thirteen parts by weight of a resin solution to give the necessary resin content as shown above. Softener and toluol are added and the whole mixed until thorough incorporation is produced. A clear dark amber colored solution should be produced.

The nitrocellulose base solution referred to in the preceding paragraph has the following composition:

| | Per cent. |
|---|---|
| Butyl acetate | 35 |
| Butyl alcohol | 11 |
| Ethyl acetate | 12 |
| 2-B denatured alcohol | 16 |
| Acetone | 3 |
| Methyl alcohol | 6 |
| Pyroxylin | 17 |
| Total | 100 |

An ordinary barrel type of mixture is used in making up this solution. The nitrocotton, having a viscosity of about 35,000 centipoises, plus .8% of its weight of crystalline sodium acetate is added to the mixer, care being taken that there is a thorough intermixing of the salt and nitro-cotton. The solvents are then added, and the whole thoroughly mixed until an easily flowing solution is obtained. This solution is then run into barrels which are placed in a closed room maintained at 38–40° C. Samples are taken from these barrels from time to time and viscosity measurements make until the difference between separate viscosity measurements indicates that the reducing action has practically ceased. This has been found by experience to require about four to six weeks for this type of mixture. When this point is reached the barrels are withdrawn from the heated room and stored at ordinary room temperature until such time as the contents are needed for use in regular mixtures. The nitrocellulose component of the reduced viscosity solution, when isolated, and dissolved in C. P. ethyl acetate, forms a solution having a viscosity of about 600 to 700 centipoises at 28° C.

The resin solution may be prepared in the usual way by dissolving the resin to be used (e. g. dammar, shellac, or elemi) in a solvent mixture in which it dissolves readily, and which mixes readily with the nitrocellulose base solution, and separating the clear solution by decantation after the insoluble portion has settled.

EXAMPLE 2.

Another typical lacquer coming within the scope of my invention has the following composition:

Lacquer #2.

| | Per cent. |
|---|---|
| Nitrocellulose of reduced viscosity | 18.30 |
| Butyl acetate | 23.40 |
| Ethyl acetate | 9.60 |
| Butyl alcohol | 5.40 |
| Denatured alcohol | 12.40 |
| Acetone | 1.70 |
| Methyl alcohol | 3.90 |
| Resin or gum | 5.80 |
| Benzol | 1.80 |
| Toluol | 12.70 |
| Dibutyl phthalate | 5.00 |
| Total | 100.00 |

The viscosity of the above described lacquer No. 2 as measured by the Stormer viscometer at 28° C. is between 1300 and 1500 centipoises. When thinned by adding 40 parts of thinner to 60 parts of lacquer the viscosity is between 100 and 300 centipoises.

In the above described lacquer #2 there may be used for the resin constituent any of the resins or gums mentioned above; and in place of dibutyl phthalate, other solvent softeners may be used.

The pyroxylin used in lacquer #2 has an average viscosity below 400 centipoises, and preferably of about 300 centipoises. This low average viscosity pyroxlyn is prepared by mixing twenty-one (21) parts by weight of the nitrocellulose base solution (a) described in connection with lacquer #1 (said base solution containing 17% of nitrocellulose having a viscosity of about 625 centipoises), with about forty-nine (49) parts of a base solution (b) of practically the same solvent composition as base solution (a) but containing 30% of nitrocellulose whose 16 oz. C. P. ethyl acetate solution has a viscosity of about 160 centipoises.

A nitrocellulose base solution (b), containing nitrocellulose whose 16 oz. C. P. ethyl acetate solution has a viscosity of between 90 and 340 centipoises when measured by the Stormer viscometer at 28° C., may be produced by dissolving in a solvent composition a soluble nitro-cotton whose 16 oz. C. P. ethyl acetate solution has a viscosity of about 35000 centipoises at 28° C., to form a solution having the following composition:

|  | Per cent. |
|---|---|
| Butyl acetate | 33.30 |
| Butyl alcohol | 5.70 |
| Acetone, C. P. | 2.30 |
| Ethyl acetate | 11.80 |
| Methyl alcohol, (99%) | 5.40 |
| 2-B denatured alcohol | 12.00 |
| Nitrocellulose | 30.00 |
|  | 100.00 | and subjecting the nitro-cotton in this solution to the action of sodium acetate. The detailed procedure for making base solution (b) is exactly similar to that described above for making base solution (a), except that the sodium acetate added is equal to 2% of the weight of the nitrocotton used. The time necessary to obtain the required reduction in viscosity is two to three weeks at 38-40° C.

To manufacture the lacquer, the following procedure is followed:

Forty-nine parts by weight of the 3% base, and twenty-one parts by weight of the 17% base are mixed with twelve and one-half parts by weight of a resin solution, and the necessary amounts of dibutyl phthalate and toluol added. The whole is mixed until a clear dark amber solution is obtained, and it is then ready for application. Reduced to formulation on this basis the composition reads:

|  | Per cent. |
|---|---|
| 30% base | 49.00 |
| 17% base | 21.00 |
| Resin solution | 12.50 |
| Dibutyl phthalate | 5.00 |
| Toluol | 12.50 |
|  | 100.00 |

Although the viscosity of my new coating compositions when ready for use as dip or spray lacquers or enamels, is from about 100 to 390 centipoises, I preferably employ a nitrocellulose whose viscosity-characteristic is such that the finished coating composition will have a viscosity of about 125 centipoises, the nitrocellulose content being above 9%, and, more specifically, a coating composition, with the above approximate viscosity having a nitrocellulose content above 7% and a total solids content, exclusive of pigment, above 15%.

EXAMPLE 3.

Where an enamel is to be prepared a pigment is incorporated in the coating composition, the percentage of pigment being usually between 5 and 30% based upon the weight of the finished enamel. As suitable pigments there may be mentioned zinc oxide, lithopone, titanium oxide, blanc fixe, ultramarine blue, and carbon blacks. Other mineral pigments and lakes in general may be used. A typical enamel illustrative of my invention has the following composition, the viscosity of the nitrocellulose used therein being between 400 and 1500 centipoises in 16 oz. ethyl acetate solution:

|  | Per cent. |
|---|---|
| Pigment | 9.00 |
| Pyroxylin | 10.50 |
| Resin or gum | 7.60 |
| Dibutyl phthalate | 6.50 |
| Butyl acetate | 21.60 |
| Butyl alcohol | 7.20 |
| Ethyl acetate | 8.60 |
| Denatured alcohol | 15.00 |
| Acetone | 1.70 |
| Methyl alcohol | 3.90 |
| Benzol | 8.40 |
|  | 100.00 |

This enamel will show a viscosity in the neighborhood of 1,000 centipoises and will have to be thinned in the neighborhood of 30% of thinner and 70% of enamel to obtain spraying viscosity.

The volatile solvents employed in these high percentage pyroxylin, low viscosity coating compositions are chiefly acetone, acetone oils, the lower alcohols (methyl, ethyl, etc.) and the lower alkyl acetates, such as ethyl, propyl, butyl, and amyl acetates. As diluents there may be used the volatile petroleum hydrocarbons, and the benzenoid hydrocarbons such, for example, as benzene and toluene. I have found it advantageous to employ low boiling alcohols and certain high boiling esters or ketones, such as butyl acetate, in approximately the proportions described; that is, the low boiling alcohols approximately in the same proportion as the nitrocellulose and the high boiling esters or ketones approximately from an equal proportion to about three times the proportion of nitrocellulose. I have found it advantageous to have the proportion of resin or gum in many cases approximately two-thirds to one-half that of the nitrocellulose and the solvent softener approximately one-third to one-seventh that of the nitrocellulose as shown by the foregoing examples, although some deviation may be made from these proportions. The proportion of pigment will vary from 5 to 30% as stated previously, according to the nature of the lacquer or enamel desired to be produced, and the quality of pigment; as shown by the examples, the proportion is preferably 5 to 9 parts for 10 or 12 of nitrocellulose.

The viscosity values herein mentioned are values obtained at 28° C. with a 500 g. weight, with the aid of the Stormer viscometer, and, in the cases of nitrocellulose, they are the values of a 16-oz. chemically pure ethylacetate solution thereof. The viscosity characteristic of the nitrocellulose employed in the foregoing compositions should be below 1500 centipoises when employing low viscosity nitrocellulose, and will often preferably be below 400 centipoises. In view of the favorable action of sodium acetate or its equivalents in reducing the viscosity of nitrocellulose, as herein described, there will be no disintegration thereof so as to reduce the nitrogen content to too low a figure, and it is therefore unnecessary to specify a lower value for the viscosity characteristic, but such may be well below 400 or even 100 centipoises.

The films produced from the lacquers and enamels described above will be hard, durable, tough, adhesive, and relatively non-shrinking. The films will, as before stated, be used to form relatively thick coats on rigid surfaces, and owing to the presence of solvent softeners, they will have good flexibility and the non-softeners will reinforce the low viscosity nitrocellulose (which is relatively very low), so that both materials will cooperate in providing a film which will not become brittle on aging and not show such signs of deterioration as might be shown by a low viscosity film containing no solvent softener. The presence of resins also materially enhances the quality and adhesion of the films, and thus, in conjunction with the solvent softeners, provides a film not heretofore produced. By the addition of pigments in the relative proportions described, a successful colored film may be produced.

As many apparently widely different embodiments of this invention may be made without department from the spirit thereof, it is to be understood that I do not intend to limit myself to the specific embodiments thereof except as indicated in the appended claims.

I claim:

1. A nitrocellulose coating composition comprising in combination nitrocellulose whose viscosity characteristic is such that a 16-oz. C. P. ethyl acetate solution thereof has a viscosity at 28° C. of below 1500 centipoises; and a solvent softener for the nitrocellulose.

2. A nitrocellulose coating composition comprising in combination nitrocellulose whose viscosity characteristic is such that a 16-oz. C. P. ethyl acetate solution thereof has a viscosity at 28° C. of below 400 centipoises; and a solvent softener for the nitrocellulose.

3. A nitrocellulose coating composition comprising in combination a reduced viscosity nitrocellulose whose viscosity characteristic is such that a 16-oz. C. P. ethyl acetate solution thereof has a viscosity at 28° C. of below 1500 centipoises; a solvent softener for the nitrocellulose having a melting point below 50° C. and being non-volatile.

4. A pyroxylin coating composition having a viscosity of between 100 and 300 centipoises at 28° C., and containing more than 9% of nitrocellulose, a volatile nitrocellulose-solvent, and a solvent softener for the nitrocellulose, the viscosity-characteristic of said nitrocellulose being such that a 16-oz. C. P. ethyl acetate solution thereof has a viscosity at 28° C. of less than 1500 centipoises.

5. A pyroxylin lacquer comprising, in combination, nitrocellulose, a substantially non-volatile solvent softener therefor, and a gum, said nitrocellulose having a viscosity characteristic which, when expressed in terms of the viscosity of a 16 oz. C. P. ethyl acetate solution thereof, is less than 1500 centipoises.

6. A lacquer as defined in claim 2 in which the softener comprises dibutyl phthalate.

7. A pyroxylin enamel comprising nitrocellulose, a solvent softener therefor, a pigment, and a gum, the viscosity-characteristic of the nitrocellulose, expressed in terms of the viscosity of a 16 oz. ethyl acetate solution thereof, being below 400 centipoises.

8. A coating composition comprising a low viscosity nitrocellulose having a viscosity characteristic below 1500 centipoises as defined; a solvent softener in the proportion of about two-thirds to one-seventh of the nitrocellulose; and a resin in the proportion of less than one-half of the proportion of the nitrocellulose.

9. A coating composition comprising a low viscosity nitrocellulose having a viscosity characteristic below 1500 centipoises as defined; a solvent softener in the proportion of about one-seventh to two-thirds that of the nitrocellulose; a resin less than one-half that of the nitrocellulose; and a low boiling alcohol in about the same proportion as the nitrocellulose.

10. A coating composition comprising a low viscosity nitrocellulose having a viscosity characteristic below 1500 centipoises as defined; a solvent softener in the proportion of about one-seventh to two-thirds that of the nitrocellulose; a resin less than one-half the proportion of the nitrocellulose; a low boiling alcohol in about the same proportion as the nitrocellulose; and a high boiling ketone or ester in a proportion from about one to three times that of the nitrocellulose.

11. A coating composition comprising a low viscosity nitrocellulose having a viscosity characteristic below 1500 centipoises as defined; a solvent softener from about one-seventh to two-thirds the proportion of the nitrocellulose; and a resin in less than one-half the proportion of nitrocellulose.

12. A coating composition comprising a low viscosity nitrocellulose having a viscosity characteristic below 1500 centipoises as defined; a resin, and a pigment; the proportion of the resin being less than half that of the nitrocellulose, and the proportion of pigment being from 5 to 30 parts for about 12 of the nitrocellulose.

13. A coating composition comprising a low viscosity nitrocellulose having a viscosity characteristic below 1500 centipoises as defined, a resin, a solvent softener, and a pigment; the proportion of resin being less than half that of the nitrocellulose, the proportion of softener being from one-seventh to two-thirds that of the nitrocellulose, and the proportion of pigment being from 5 to 30 parts for about 12 of the nitrocellulose.

14. A coating composition comprising a low viscosity nitrocellulose having a viscosity characteristic below 1500 centipoises as defined, in the proportion of about 10 parts; a resin less than 5 parts; a pigment 5 to 9 parts; a solvent softener from 2 to 7 parts; a small proportion of non-drying oil, but substantially no drying oil; and solvents to provide a flowable or spraying lacquer.

15. A coating composition comprising a low viscosity nitrocellulose having a viscosity characteristic below 1500 centipoises as defined, in the proportion of about 10 parts; a solvent softener from 2 to 7 parts; a pigment 5 to 9 parts; and solvents to provide a flowable or spraying lacquer.

16. An article coated with a hard, durable, tough, adhesive, film containing nitrocellulose whose viscosity characteristic is below 1500 centipoises as defined, and a solvent softener.

17. An article coated with a hard, durable, tough, adhesive, substantially non-shrinking film containing nitrocellulose whose viscosity characteristic is below 1500 centipoises as defined, a solvent softener, and a resin.

18. An article coated with a hard, durable, tough, adhesive, substantially non-shrinking film containing nitrocellulose whose viscosity characteristic is below 400 centipoises as defined, and a solvent softener.

19. An article coated with a hard, durable, tough, adhesive, substantially non-shrinking film containing nitrocellulose whose viscosity characteristic is below 1500 centipoises, a solvent softener in the proportion of one-seventh to two-thirds that of the nitrocellulose, and a pigment in the proportion of 5 to 9 parts for 12 of nitrocellulose.

20. An article coated with a hard, durable, tough, adhesive, substantially non-shrinking film containing nitrocellulose whose viscosity characteristic is below 1500 centipoises, a resin in the proportion of less than half that of the nitrocellulose, and a pigment in the proportion of 5 to 9 parts for 12 of nitrocellulose and a solvent softener.

21. An article coated with a hard, durable, tough, adhesive, substantially non-shrink-film containing nitrocellulose whose viscosity characteristic is below 1500 centipoises, a solvent softener in the proportion of one-seventh to two-thirds that of the nitrocellulose, a resin in the proportion of less than half that of the nitrocellulose, and a pigment in the proportion of 5 to 30 parts for 12 of nitrocellulose.

In testimony whereof I affix my signature.

MAURICE VALENTINE HITT.

CERTIFICATE OF CORRECTION.

Patent No. 1,710,453.        Granted April 23, 1929, to

MAURICE VALENTINE HITT.

It is hereby certified that error appears in the printed specification of the above numbered patent requiring correction as follows: Page 1, line 35, for the word "be" read "been"; page 3, line 39, for the word "mixture" read "mixer"; page 5, line 24, for the compound word "non-softeners" read "solvent softeners"; and that the said Letters Patent should be read with these corrections therein that the same may conform to the record of the case in the Patent Office.

Signed and sealed this 11th day of June, A. D. 1929.

(Seal)

M. J. Moore,
Acting Commissioner of Patents.

low viscosity nitrocellulose having a viscosity characteristic below 1500 centipoises as defined; a resin, and a pigment; the proportion of the resin being less than half that of the nitrocellulose, and the proportion of pigment being from 5 to 30 parts for about 12 of the nitrocellulose.

13. A coating composition comprising a low viscosity nitrocellulose having a viscosity characteristic below 1500 centipoises as defined, a resin, a solvent softener, and a pigment; the proportion of resin being less than half that of the nitrocellulose, the proportion of softener being from one-seventh to two-thirds that of the nitrocellulose, and the proportion of pigment being from 5 to 30 parts for about 12 of the nitrocellulose.

14. A coating composition comprising a low viscosity nitrocellulose having a viscosity characteristic below 1500 centipoises as defined, in the proportion of about 10 parts; a resin less than 5 parts; a pigment 5 to 9 parts; a solvent softener from 2 to 7 parts; a small proportion of non-drying oil, but substantially no drying oil; and solvents to provide a flowable or spraying lacquer.

15. A coating composition comprising a low viscosity nitrocellulose having a viscosity characteristic below 1500 centipoises as defined, in the proportion of about 10 parts; a solvent softener from 2 to 7 parts; a pigment 5 to 9 parts; and solvents to provide a flowable or spraying lacquer.

16. An article coated with a hard, durable, tough, adhesive, film containing nitrocellulose whose viscosity characteristic is below 1500 centipoises as defined, and a solvent softener.

17. An article coated with a hard, durable, tough, adhesive, substantially non-shrinking film containing nitrocellulose whose viscosity characteristic is below 1500 centipoises as defined, a solvent softener, and a resin.

18. An article coated with a hard, durable, tough, adhesive, substantially non-shrinking film containing nitrocellulose whose viscosity characteristic is below 400 centipoises as defined, and a solvent softener.

19. An article coated with a hard, durable, tough, adhesive, substantially non-shrinking film containing nitrocellulose whose viscosity characteristic is below 1500 centipoises, a solvent softener in the proportion of one-seventh to two-thirds that of the nitrocellulose, and a pigment in the proportion of 5 to 9 parts for 12 of nitrocellulose.

20. An article coated with a hard, durable, tough, adhesive, substantially non-shrinking film containing nitrocellulose whose viscosity characteristic is below 1500 centipoises, a resin in the proportion of less than half that of the nitrocellulose, and a pigment in the proportion of 5 to 9 parts for 12 of nitrocellulose and a solvent softener.

21. An article coated with a hard, durable, tough, adhesive, substantially non-shrink-film containing nitrocellulose whose viscosity characteristic is below 1500 centipoises, a solvent softener in the proportion of one-seventh to two-thirds that of the nitrocellulose, a resin in the proportion of less than half that of the nitrocellulose, and a pigment in the proportion of 5 to 30 parts for 12 of nitrocellulose.

In testimony whereof I affix my signature.

MAURICE VALENTINE HITT.

---

CERTIFICATE OF CORRECTION.

Patent No. 1,710,453.  Granted April 23, 1929, to

MAURICE VALENTINE HITT.

It is hereby certified that error appears in the printed specification of the above numbered patent requiring correction as follows: Page 1, line 35, for the word "be" read "been"; page 3, line 39, for the word "mixture" read "mixer"; page 5, line 24, for the compound word "non-softeners" read "solvent softeners"; and that the said Letters Patent should be read with these corrections therein that the same may conform to the record of the case in the Patent Office.

Signed and sealed this 11th day of June, A. D. 1929.

(Seal)

M. J. Moore,
Acting Commissioner of Patents.